Figure 2:
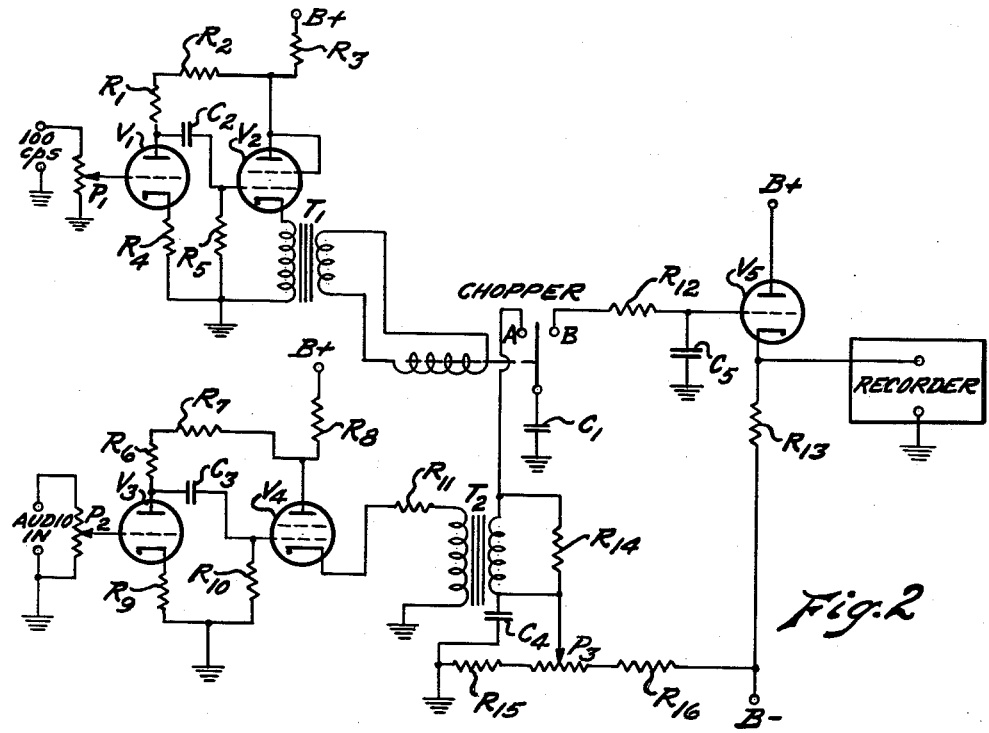

July 17, 1962 L. F. SHODIN 3,045,182
PRECISE DOPPLER MEASUREMENT
Filed June 16, 1959

INVENTOR.
LEONARD F. SHODIN
BY
ATTORNEYS

United States Patent Office 3,045,182
Patented July 17, 1962

3,045,182
PRECISE DOPPLER MEASUREMENT
Leonard F. Shodin, 17 Melody Lane, Waltham, Mass.
Filed June 16, 1959, Ser. No. 820,832
12 Claims. (Cl. 324—79)
(Granted under Title 35, U.S. Code (1952), sec. 266)

The invention described herein may be manufactured and used by or for the United States Government for governmental purposes without payment to me of any royalty thereon.

This invention relates generally to measurement devices and more particularly to methods and means for accurate measurements of frequency changes. The invention also embraces phase determining methods and means.

One application of the invention involves the Doppler tracking of satellites of the signal emitting variety. Systems for tracking heretofore utilized expensive, cumbersome, frequency counting apparatus.

The technique of this invention as applied to tracking involves determination of the precise time when a Doppler beat note passes through a harmonic of a reference signal. Although the invention is described in terms of its application to the tracking of satellites, the disclosed frequency and phase determining techniques obviously have utility in many other operations involving analysis and/or utilization of Doppler effects and analogous phenomena of the telecommunications arts.

The methods and means of my invention as disclosed herein yield accurate measurements even when Doppler frequency changes occur with high rapidity. In this respect the invention presents an important improvement over frequency counting apparatus and other prior art devices in which the human element is present.

Accordingly, it is an object of this invention to provide a method and means for precise determination of frequency.

It is another object of this invention to provide means for making precise frequency phase determination.

It is still another object of this invention to provide a novel method and apparatus for determining the precise time a Doppler beat note passes through a harmonic of a reference signal.

It is a further object of this invention to provide a method and apparatus for frequency and phase determinations utilizing harmonics of a standard and a storage system.

It is a still further object of this invention to provide a frequency and phase measurement system which is more accurate and less expensive than prior art devices.

Another object of this invention involves the production of frequency measurement apparatus which utilizes conventional, currently available components that lend themselves to standard mass production manufacturing techniques.

Still another object of this invention involves the production of novel frequency measurement apparatus which does not give spurious readings in the presence of noise signals.

Figure 1:
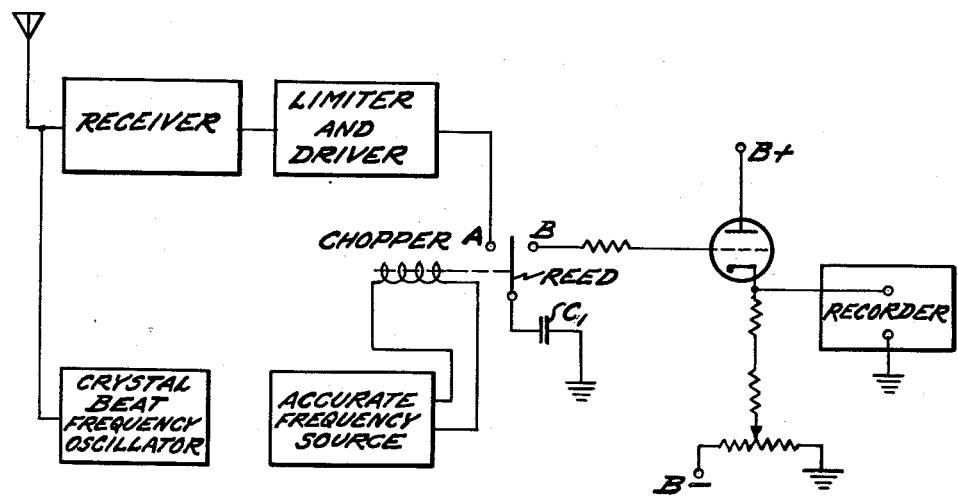

These and other advantages, features, and objects of the invention will become more apparent from the following description taken in connection with the illustrative embodiment in the accompanying drawings wherein:

FIGURE 1 is a partial block and partial schematic representation of a device embodying this invention; and FIGURE 2 is a circuit diagram of apparatus embodying the instant invention.

In the Doppler reception of a satellite, a fixed standard frequency oscillator is heterodyned against a satellite signal such that an audio tone, which changes in pitch in accordance with the movement of the satellite, appears at the output of a receiver. The audio frequency output is difficult to measure since it is always changing. By utilizing a low frequency oscillator standard with a harmonic coincidence system the Doppler frequencies may be precisely measured.

Referring to FIGURE 1, a Doppler satellite signal is received on an antenna heterodyned by a crystal oscillator and presented to a receiver wherein the satellite signal output is a Doppler audio tone. For satellite applications the Doppler signal is presented to a limiter and low impedance driver. An accurate low frequency standard source is utilized to drive a reed of a chopper. The Doppler signal from the low impedance driver appears on chopper contact A and is a low impedance signal such that, when the chopper reed dwells on contact A, the small capacitor $C_1$ does not alter the phase or amplitude of the signal. The Doppler signal is relatively high in frequency as compared with the low frequency standard so that many audio cycles of the Doppler signal occur during the dwell time on contact A. The voltage which is present just as contact A opens is the voltage which determines the stored charge on capacitor $C_1$ and is presented to contact B for amplification as shown by the cathode follower circuit and presented to a recorder which may be an oscilloscope, meter, etc. The charge on capacitor $C_1$ may be positive, negative or zero; therefore, since the cycling time is in accordance with the frequency of the low frequency standard, similar voltages will appear on contact B each time the chopper recycles which determines that the Doppler signal is an integral multiple of the low frequency standard and results in a zero beat type of indication on contact B and the recorder.

Assuming a low frequency standard of 100 c.p.s. which cycles the reed of the chopper each 1/100 second and a Doppler signal of 1,000 c.p.s., then contact A would break at the same point on the Doppler waveform every ten cycles; and at 1100 cycles contact A would break at the same point every eleven cycles. The slightest deviation from frequency multiples of 100 c.p.s. produces a fluctuating output while all multiples of 100 c.p.s. produce the same output if the harmonics are in phase. A time base may be presented to the recorder in order to compare the change in frequency with respect to time.

The circuitry of FIGURE 2 shows in schematic diagram form representative circuitry in which the frequency measuring apparatus may be embodied. $V_1$ and $V_3$ are standard triode amplifier circuits while $V_2$, $V_4$ and $V_5$ are standard cathode follower circuits having a low impedance output.

Although the invention is not limited thereto, the following listing presents a representative set of values for the circuit of FIGURE 2 wherein resistances are in ohms at .5 watt and capacitances are in microfarads unless otherwise specified.

| | |
|---|---|
| $V_1$, $V_3$, $V_5$ | 6J5. |
| $V_2$, $V_4$ | 6V6. |
| $P_1$, $P_2$ | .5 Meg. |
| $P_3$ | 20K. |
| $R_1$, $R_6$ | 100K. |
| $R_2$, $R_7$ | 22K. |
| $R_3$, $R_8$ | 250, 10 w. |
| $R_4$, $R_9$ | 1K. |
| $R_5$, $R_{10}$ | .5 Meg. |
| $R_{11}$ | 100. |
| $R_{12}$ | 470K. |
| $R_{13}$ | 7500, 5 w. |
| $R_{14}$ | 300. |
| $R_{15}$ | 10K. |
| $R_{16}$ | 24K. |
| $C_1$ | .001. |

| | |
|---|---|
| $C_2$, $C_3$ | .1 |
| $C_4$ | 4 |
| $C_5$ | .02 |
| B+ | 250 v. |
| B− | 100 v. |
| Chopper | Airpax No. 176 6 v. coil. |

Although the invention has been described relative to satellite tracking it should be apparent to one skilled in the art that the invention is capable of a variety of alternative embodiments in which frequency or phase determinations are desired. For example, the device may be used to fine tune a device to an exact frequency, and for high frequency applications the chopper reed may be replaced by an electronic switch. I intend to be limited only by the spirit and scope of the appended claims.

I claim:

1. A method of utilizing the "Doppler" behavior of cyclically occurring electrical signals for the purpose of tracking an earth-orbiting satellite comprising the steps of receiving a signal to be measured, applying said signal to a first contact of a switching means, simultaneously operating said switching means at a fixed frequency which is low in frequency as compared with the frequency of said signal, storing the signal potential present at the instant of contact departure from said first contact, and presenting said signal to a second contact of said switch for recording such that when the voltages presented to said second contact are the same at each cycle of said switching means, the frequency of the received signal is an integral multiple of the frequency of operation of said switching means.

2. A method of tracking an earth-orbiting satellite emitting a cyclically occurring electrical signal comprising the steps of heterodyning said signal having a constantly changing frequency to substantially an audio frequency which is low in frequency as compared with the frequency of said signal, simultaneously sampling said signal at a fixed frequency which is low in frequency as compared with the frequency of said signal and applying said signal to a recorder such that when subsequent cycles of said fixed frequency sample signal potentials which are equal and in phase, a zero beat indication appears on said recorder thus determining the Doppler signal to be an integral multiple of said fixed frequency.

3. A method of tracking an earth-orbiting satellite emitting a cyclically occurring electrical signal comprising the steps of heterodyning said signal to a substantially audio frequency, presenting said signal to a first contact of a switching means, simultaneously cycling said switching means at a fixed, predetermined frequency which is low in frequency as compared with the frequency of said signal, storing the signal potential which appears at said contact at the instant of contact departure of said switching means, and presenting said voltage to a second contact of said switch for presentation to an indicator means such that when the stored voltages on subsequent cycles of said switch are equal and in phase, a zero beat indication occurs on said indicator means thereby determining said Doppler signal to be an integral harmonic of the frequency of switch operation.

4. Apparatus for tracking an earth-orbiting satellite emitting a cyclically occurring signal comprising a switching means for sampling the signal whose frequency is to be determined and means for simultaneously operating said switching means at a predetermined frequency which is low in frequency as compared with the frequency of said signal, means connected with said switching means for storing the sampled signal for presentation to an indicator, and indicator means connected with said switching means for receiving said stored signals such that successive sampled signals of the same frequency and phase add to give a zero beat indication on said indicator means.

5. Apparatus for tracking an earth-orbiting satellite emitting an input signal comprising a switching means for sampling said signal, means for simultaneously operating said switching means at a predetermined frequency which is low in frequency as compared with the frequency of said signal, means for storing said sampled signal to give a zero beat indication of said cyclically occurring signal, and indicator means for receiving said stored signal.

6. Apparatus for tracking an earth-orbiting satellite emitting a signal having a constantly changing frequency comprising means for heterodyning said signal to a substantially audio frequency, a switching means for simultaneously sampling said signal at a predetermined frequency which is low in frequency as compared with the frequency of said signal, means connected with said switching means for storing the potential of said sampled signal, means for connecting said sampled potential with zero beat indicator means for displaying said sampled potentials such that potentials of successive samplings are equal in potential and phase when the frequency change is a harmonic of the frequency of said switching means.

7. An apparatus for tracking an earth-orbiting satellite emitting a signal having a constantly changing frequency comprising an indicator, a switch means connected with said indicator and said signal, storage means connected with said switch means, and means connected to operate said switch means at a fixed, predetermined frequency which is low in frequency as compared with the frequency of said signal to sample the potential of said signal and present the stored potential to zero beat indicator means.

8. A method of tracking an earth-orbiting satellite emitting a cyclically occurring electrical signal having a constantly changing frequency comprising the steps of: heterodyning said signal to a substantially audio frequency, simultaneously sampling said signal at a predetermined fixed frequency which is low in frequency as compared with the frequency of said signal, and applying said signal in such manner that when subsequent cycles of said signal are equal in amplitude and phase, there is obtained a zero beat indication signifying an integral multiple of said fixed frequency.

9. A method of tracking an earth-orbiting satellite emitting a cyclically occurring electrical signal having a constantly changing frequency comprising the steps of: heterodyning said signal to a substantially audio frequency, simultaneously switching said signal at a fixed, predetermined lower frequency different from the frequency of said cyclically occurring electrical signal, storing the signal potential at a predetermined time stage in the switching operation, and utilizing said potential in such manner that when the stored voltages on subsequent cycles of said switch are equal and in phase, there is obtained a zero beat indication signifying that said cyclically occurring signal is an integral harmonic of the frequency of said switching operation.

10. Apparatus for tracking an earth-orbiting satellite emitting a cyclically occurring signal having a constantly changing frequency comprising an antenna for receiving said signal, a crystal oscillator having the output thereof connected to said antenna to heterodyne said signal, a receiver having the input thereof connected to said antenna for receiving said heterodyned signal, said receiver having a Doppler audio tone output, limiter and low impedance driving means having the input thereof connected to the output of said receiver, switching means comprising a reed and a first and second chopper contact, said first chopper contact connected to the output of said receiver, means for cycling simultaneously with said audio tone said reed of said switching means at a fixed, predetermined frequency which is low in frequency as compared with the frequency of said satellite signal such that many audio cycles occur during the dwell time of said reed on said first contact, capacitance means connected between ground and said reed having a stored charge equal to the voltage present just as said first chopper contact opens, a cathode follower circuit connected to said second contact, and indicating means connected to said cathode follower circuit for producing a zero beat indication when said constantly changing frequency of said cyclically occurring signal is an integral harmonic of the frequency of the switching operation, said indicating means having a time base to compare the rate of change of frequency.

11. A method of tracking an earth-orbiting satellite emitting a cyclically occurring signal having a constantly changing frequency comprising the steps of: heterodyning said signal to a substantially audio frequency, presenting said audio signal to a first contact of a switching means, simultaneously cycling the reed of said switching means at a fixed, predetermined frequency which is low in frequency as compared with the frequency of the satellite signal and utilizing said potential in such manner that when similar potentials are presented to said second contact on subsequent cycles of said switching means a zero beat type of indication which determines the Doppler signal is an integral multiple of said low frequency standard is produced.

12. A method of tracking an earth-orbiting satellite emitting a cyclically occurring signal having a constantly changing frequency comprising the steps of: heterodyning said signal to a substantially audio frequency, presenting said audio signal to a first contact of a switching means, simultaneously cycling the reed of said switching means at a fixed, predetermined frequency which is low in frequency as compared with the frequency of the satellite signal, storing the signal potential which appears at said first contact at the instant of contact departure, and utilizing said potential in such manner that when similar potentials are presented to said second contact on subsequent cycles of said switching means a zero beat type of indication which determines the Doppler signal is an integral multiple of said low frequency standard is produced.

References Cited in the file of this patent

UNITED STATES PATENTS

| | | |
|---|---|---|
| 2,405,597 | Miller | Aug. 13, 1946 |
| 2,443,195 | Pensyl | June 15, 1948 |
| 2,532,338 | Schlesinger | Dec. 5, 1950 |
| 2,640,106 | Wilson et al. | May 26, 1953 |
| 2,645,755 | Garfield | July 14, 1953 |
| 2,666,136 | Carpenter | Jan. 12, 1954 |
| 2,679,028 | Otis et al. | May 18, 1954 |
| 2,752,593 | Downs | June 26, 1956 |
| 2,822,978 | Donovan | Feb. 11, 1958 |
| 2,829,251 | Patton | Apr. 1, 1958 |
| 2,914,672 | Powell | Nov. 24, 1959 |
| 2,919,403 | Buntenbach | Dec. 29, 1959 |

FOREIGN PATENTS

| | | |
|---|---|---|
| 697,228 | Germany | Oct. 9, 1940 |
| 443,814 | Italy | Jan. 7, 1949 |
| 137,059 | Australia | May 1, 1950 |
| 996,799 | France | Dec. 26, 1951 |

OTHER REFERENCES

"Doppler Effect in Radio and Radar," article in Wireless World, July 1958, pp. 304–307.